United States Patent
No

(10) Patent No.: US 10,156,755 B2
(45) Date of Patent: Dec. 18, 2018

(54) LIQUID CRYSTAL DISPLAY

(71) Applicant: Samsung Display Co., Ltd., Yongin (KR)

(72) Inventor: Sang Yong No, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 527 days.

(21) Appl. No.: 14/752,203

(22) Filed: Jun. 26, 2015

(65) Prior Publication Data
US 2016/0216567 A1  Jul. 28, 2016

(30) Foreign Application Priority Data

Jan. 23, 2015  (KR) .......................... 10-2015-0011105

(51) Int. Cl.
*G02F 1/1343* (2006.01)
*G02F 1/1337* (2006.01)
(Continued)

(52) U.S. Cl.
CPC ...... *G02F 1/134309* (2013.01); *G02F 1/1339* (2013.01); *G02F 1/1368* (2013.01); *G02F 1/133345* (2013.01); *G02F 1/133707* (2013.01); *G02F 1/136227* (2013.01); *G02F 2001/13373* (2013.01); *G02F 2001/13398* (2013.01); *G02F 2001/134345* (2013.01)

(58) Field of Classification Search
None
See application file for complete search history.

(56) References Cited

U.S. PATENT DOCUMENTS

2008/0316412 A1  12/2008  Lo et al.
2010/0134731 A1*  6/2010  Jeon .................... G02F 1/13624
                                                                349/110
2012/0249902 A1  10/2012  Seok et al.

FOREIGN PATENT DOCUMENTS

CN            103246116         8/2013
KR       10-2007-0035145        3/2007
(Continued)

OTHER PUBLICATIONS

European Search Report dated Dec. 15, 2015, for European Patent Application No. 15187255.

*Primary Examiner* — Richard Kim
(74) *Attorney, Agent, or Firm* — H.C. Park & Associates, PLC

(57) ABSTRACT

A liquid crystal display (LCD) includes: a substrate including a light transmitting region and a light blocking region; a thin film transistor disposed in the light blocking region, the thin film transistor including a source electrode, a drain electrode, and a gate electrode; a first insulating layer disposed on the drain electrode, the first insulating layer including a contact hole for exposing the drain electrode; a pixel electrode disposed on the first insulating layer, the pixel electrode connected to the drain electrode through the contact hole; and a protruding portion disposed on the pixel electrode, wherein the pixel electrode includes: a stem portion disposed in the light transmitting region; a plurality of branch portions connected to the stem portion; and an extension disposed in the light blocking region, the extension configured to extend from the stem portion or the branch portions, and wherein the protruding portion overlaps the extension.

20 Claims, 11 Drawing Sheets

(51) Int. Cl.
*G02F 1/1362* (2006.01)
*G02F 1/1333* (2006.01)
*G02F 1/1339* (2006.01)
*G02F 1/1368* (2006.01)

(56) References Cited

FOREIGN PATENT DOCUMENTS

| KR | 10-2008-0034545 | 4/2008 |
| KR | 10-2010-0061124 | 6/2010 |
| KR | 10-2011-0111227 | 10/2011 |

* cited by examiner

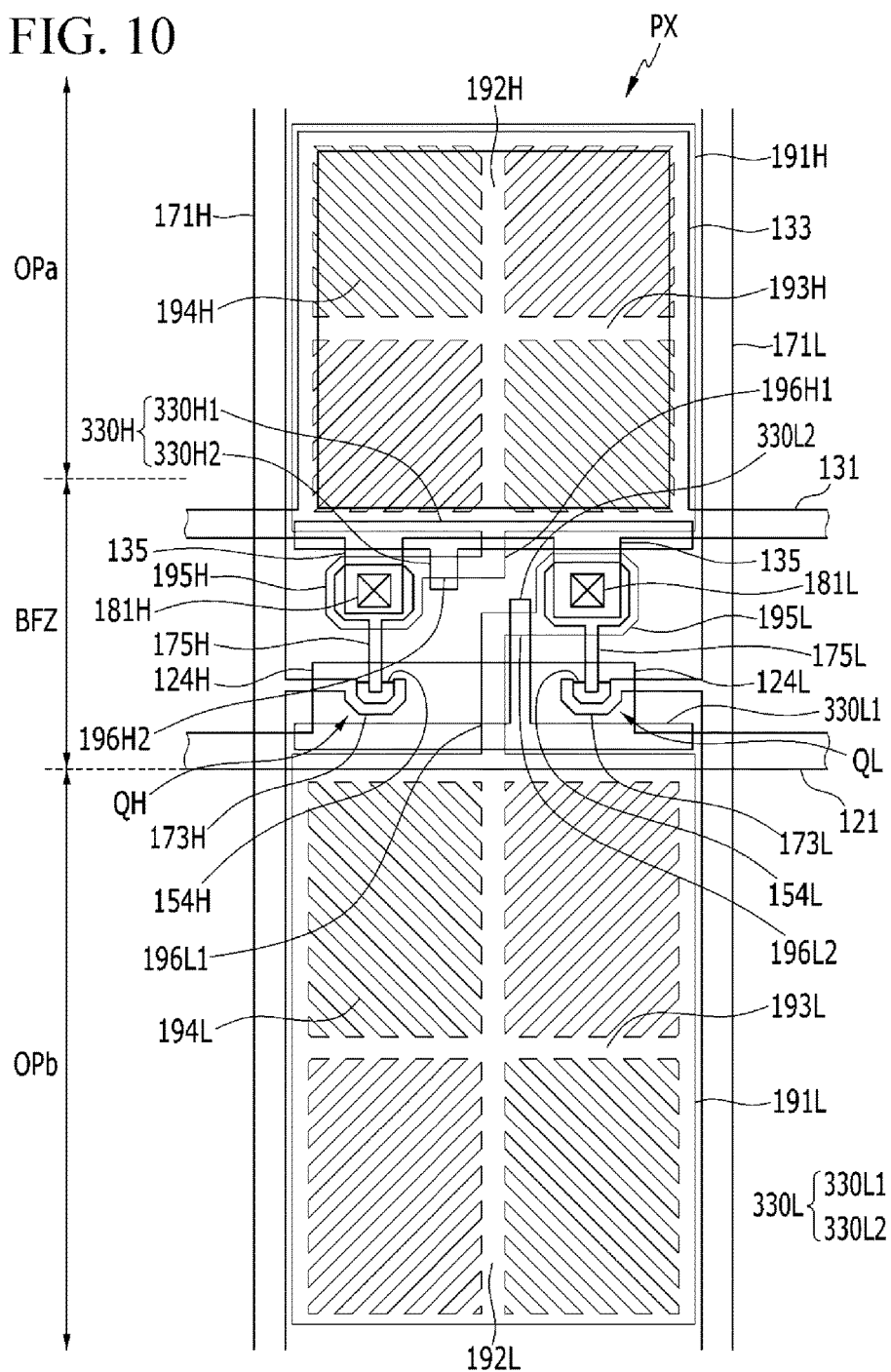

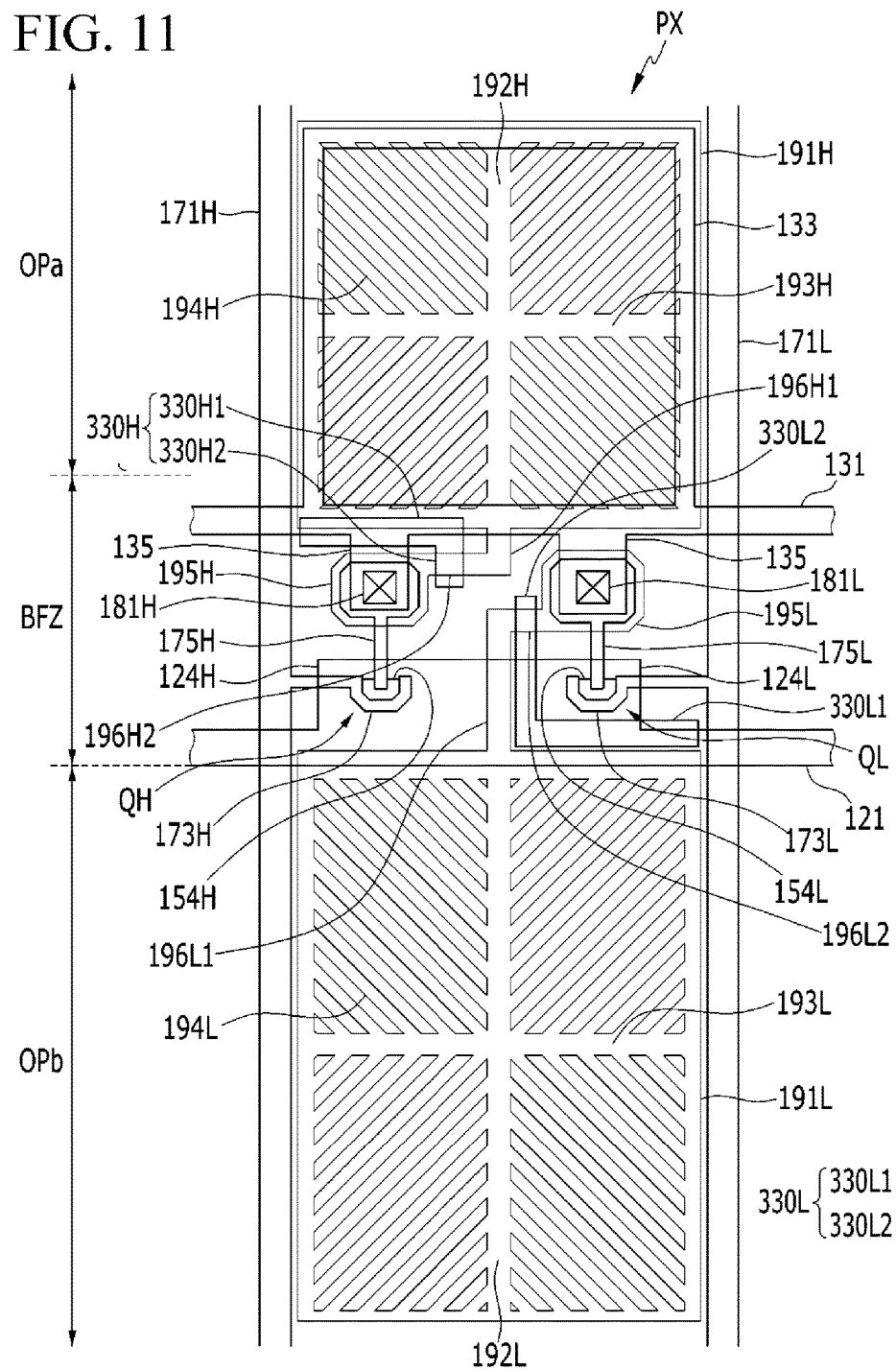

LIQUID CRYSTAL DISPLAY

CROSS-REFERENCE TO RELATED APPLICATION

This application claims priority from and the benefit of Korean Patent Application No. 10-2015-0011105, filed on Jan. 23, 2015, which is hereby incorporated by reference for all purposes as if fully set forth herein.

BACKGROUND

Field

Exemplary embodiments relate to a liquid crystal display (LCD). More particularly, exemplary embodiments relate to an LCD for enhancing control over directions of liquid crystal molecules.

Discussion of the Background

Display devices such as a liquid crystal display (LCD), an organic light emitting diode (OLED) display, etc. generally include a display panel including a plurality of pixels including switching elements and a plurality of signal lines, a gray-level voltage generator for generating a reference gray-level voltage, and a data driver using the reference gray-level voltage to generate a plurality of gray-level voltages and applying the generated gray-level voltages corresponding to an input image signal to data lines as a data signal.

Among them, the LCD includes at least one display panel including pixel electrodes and opposing electrodes, and a liquid crystal layer having dielectric anisotropy.

The pixel electrodes are arranged in a matrix form, and are connected to switching elements such as thin film transistors (TFTs) to be sequentially applied with data voltages on a row by row basis. The opposing electrodes are applied with a common voltage Vcom.

An image can be displayed by applying voltages to the pixel electrodes and the opposing electrodes to generate an electric field in the liquid crystal layer and adjusting transmittance of light transmitted through the liquid crystal layer by controlling intensity of the electric field.

A plurality of signal lines includes a plurality of data lines for transmitting a data voltage, and a plurality of gate lines for transmitting a gate signal.

The thin film transistor for transmitting the data voltage to the pixel electrode includes a semiconductor layer, a source electrode overlapping the semiconductor layer and connected to the data line, a drain electrode overlapping the semiconductor layer and facing the source electrode, and a gate electrode connected to the gate line and overlapping the semiconductor layer.

An insulating layer is disposed on the thin film transistor.

The insulating layer includes a contact hole for exposing the drain electrode, and the pixel electrode disposed on the insulating layer is electrically and physically connected to the drain electrode of the thin film transistor through the contact hole of the insulating layer.

When an external force is applied to a liquid crystal display, liquid crystal molecules therein may be partially disarranged to generate texture due to abnormal arrangement of the liquid crystal molecules. After the external force is removed, the arrangement of the liquid crystal molecules is mostly restored, but the liquid crystal molecules at a location of a contact hole may remain abnormal due to a step difference in the contact hole and inclination of an alignment layer thereon.

Particularly, when an insulating layer formed with the contact hole includes an organic material, the step of the contact hole further increases, thereby making it difficult to restore the liquid crystal molecules around the contact hole to have the original arrangement.

As such, the abnormal arrangement of liquid crystal molecules generated around the contact hole may affect an arrangement of liquid crystal molecules disposed on an adjacent pixel electrode, affecting the arrangement of the liquid crystal molecules disposed in a light transmitting region of a pixel.

As such, in the light transmitting region of the pixel, the texture generated by the liquid crystal molecules arranged in the abnormal directions may degrade display quality, and particularly, since the higher resolution the LCD has, the smaller a pixel size is, a ratio of a texture region in the light transmitting region of the single pixel increases, thereby resulting in degradation of display quality due to the more easily recognizable texture and an increase in an amount of luminance variation of the pixel.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a liquid crystal display (LCD) having improved ability to restore a disturbed arrangement of the liquid crystal molecules caused by an external force.

Additional aspects will be set forth in the detailed description which follows, and, in part, will be apparent from the disclosure, or may be learned by practice of the inventive concept.

An exemplary embodiment discloses a liquid crystal display (LCD) including: a substrate including a light transmitting region and a light blocking region adjacent to the light transmitting region; a thin film transistor disposed in the light blocking region, the thin film transistor including a source electrode, a drain electrode, and a gate electrode; a first insulating layer disposed on the drain electrode, the first insulating layer including a contact hole for exposing the drain electrode; a pixel electrode disposed on the first insulating layer, the pixel electrode connected to the drain electrode through the contact hole; and a protruding portion disposed on the pixel electrode, wherein the pixel electrode includes: a stem portion disposed in the light transmitting region; a plurality of branch portions connected to the stem portion; and an extension disposed in the light blocking region, the extension configured to extend from the stem portion or the branch portions, and wherein the protruding portion overlaps the extension.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIGS. 8, 9, 10, and 11 are plan views of a layout of single pixels of liquid crystal displays according to one or more exemplary embodiments.

DETAILED DESCRIPTION OF THE ILLUSTRATED EMBODIMENTS

Figure 1:
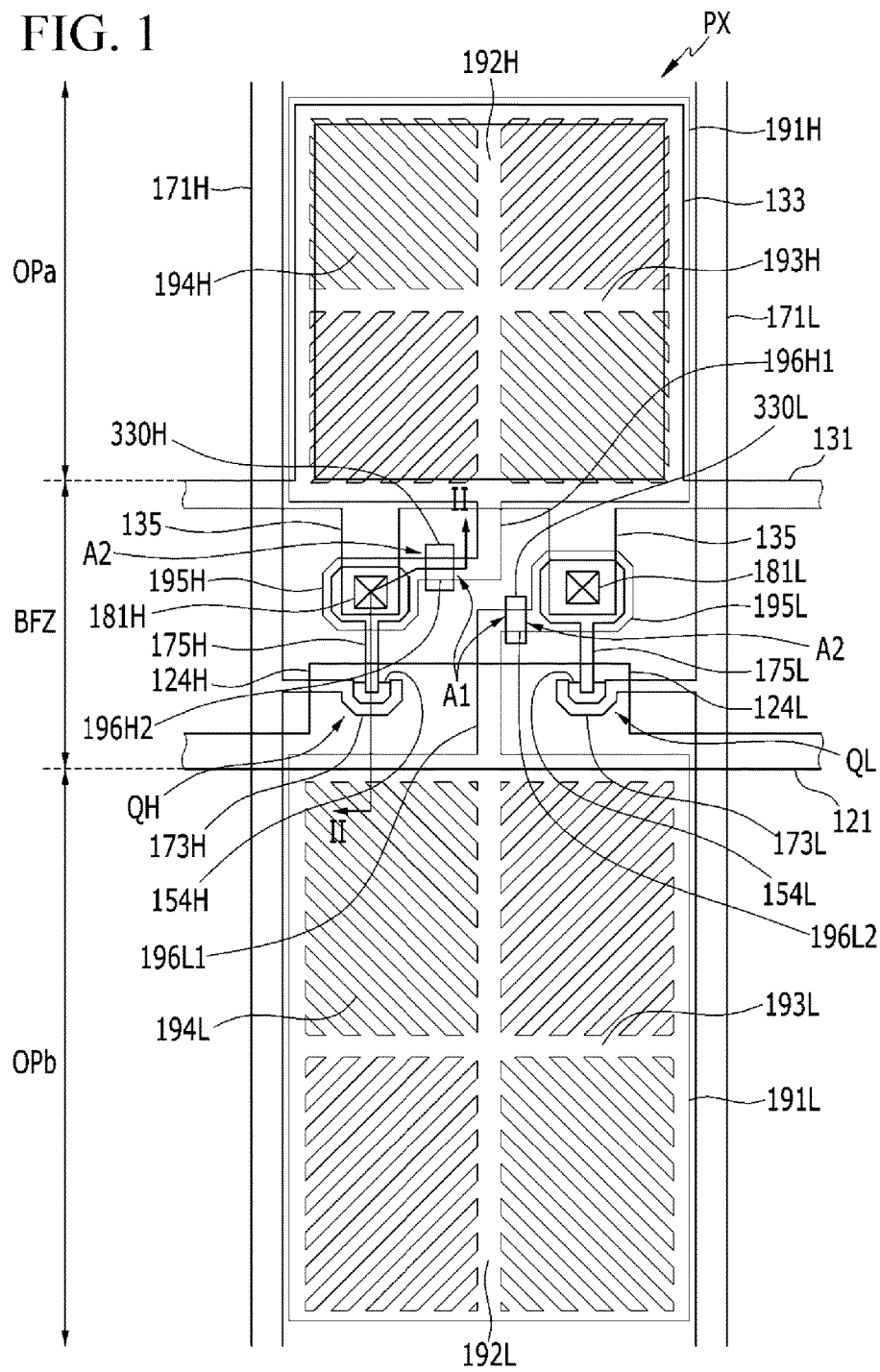
FIG. 1 is a plan view of a layout of one pixel of a liquid crystal display (LCD) according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A liquid crystal display (LCD) according to one or more exemplary embodiments will now be described in detail with reference to FIGS. 1 to 3.

Figure 2:
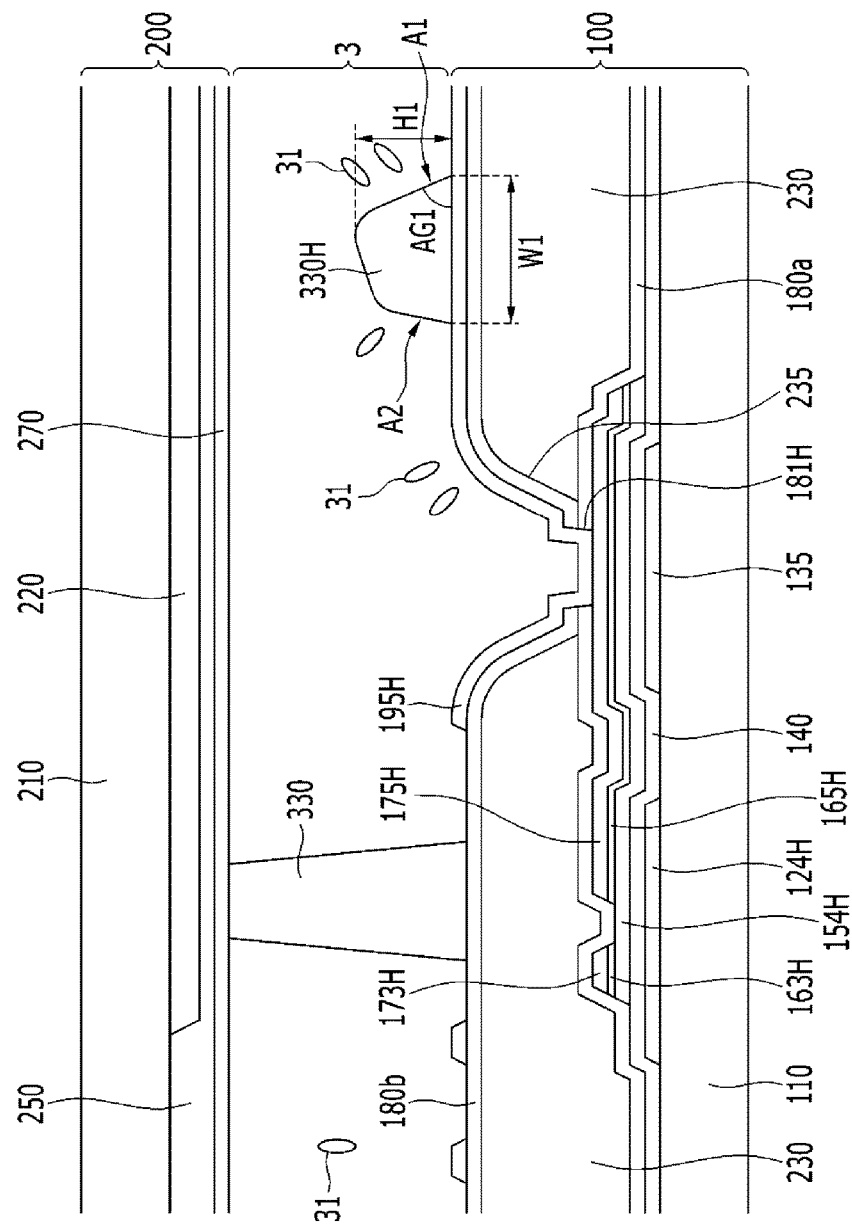
FIG. 2 is a cross-sectional view of the LCD illustrated in FIG. 1 taken along a sectional line II-II.
Figure 3:
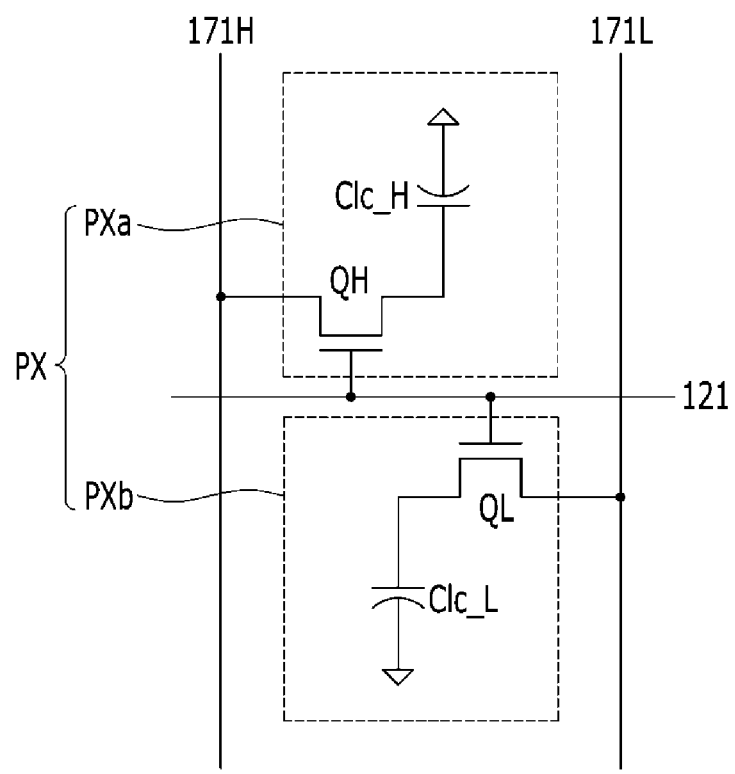
FIG. 3 is an equivalent circuit diagram of one pixel of the LCD according to an exemplary embodiment.

FIG. 1 is a plan view of a layout of one pixel of an LCD according to an exemplary embodiment, FIG. 2 is a cross-sectional view of the LCD illustrated in FIG. 1 taken along a sectional line II-II, and FIG. 3 is an equivalent circuit diagram of one pixel of the LCD according to an exemplary embodiments.

Referring to FIGS. 1 and 2, the LCD according to an exemplary embodiment includes a plurality of pixels PX. Referring to FIG. 1, one pixel PX includes a first light transmitting region OPa and a second light transmitting region OPb disposed neighboring each other, and a light blocking region BFZ disposed therebetween.

The LCD includes at least one display panel and a liquid crystal layer 3.

According to the exemplary embodiment, the LCD in which a lower display panel 100 and an upper display panel 200 are disposed facing each other and a liquid crystal layer 3 is interposed between the two display panels 100 and 200, but the exemplary embodiments are not limited thereto, and the LCD may have a structure including only a single display panel.

When viewed in a planar structure, the LCD includes a display area for displaying an image, and the display area includes a plurality of pixels PX.

The plurality of pixels PX may be arranged in a matrix form including a plurality of pixel rows and a plurality of pixel columns. However, the exemplary embodiments are not limited thereto.

The lower panel 100 will be described. A gate conductor, including a gate line 121 and a storage electrode line 131, is disposed on a substrate 110 including an insulating material such as glass, plastic, etc. The gate line 121 may be disposed mainly extending in a row direction to transmit a gate signal. The gate line 121 may include a first gate electrode 124H and a second gate electrode 124L that protrude upward and/or downward. The first gate electrode 124H and the second gate electrode 124L may be connected to each other to form a single protruding portion. However, shapes of the first gate electrode 124H and the second gate electrode 124L are not limited thereto, and may be variously modified.

The storage electrode line 131 may extend in parallel with the gate line 121, and is separated from the gate line 121. The storage electrode line 131 may include storage electrodes 133 and 135. The storage electrode 133 may be formed to protrude upward from the storage electrode line 131, extending in a row direction and forming a closed loop enclosing edges of the first light transmitting region OPa. The storage electrode 133 may be omitted. The storage electrode 135 may protrude upward and/or downward from the storage electrode line 131, extending in the row direction.

FIG. 1 illustrates an exemplary pixel, in which the storage electrode line 131 includes a pair of storage electrodes 135. Each of the pair of storage electrodes 135 may extend toward the first gate electrode 124H and the second gate electrode 124L, respectively.

A gate insulating layer 140 is disposed on the gate conductor. The gate insulating layer 140 may be formed of an inorganic insulating material including, but not limited to, a silicon nitride ($SiN_x$), a silicon oxide ($SiO_x$), etc. The gate insulating layer 140 may consist of a single layer or multiple layers.

A first semiconductor 154H and a second semiconductor 154L are disposed on the gate insulating layer 140. The first semiconductor 154H may be disposed on the first gate electrode 124H, and the second semiconductor 154L may be disposed on the second gate electrode 124L. The first and second semiconductors 154H and 154L may include, but not limited to, amorphous silicon, polycrystalline silicon, and/or a metal oxide.

Ohmic contact members 163H and 165H may be further disposed on the first and second semiconductors 154H and 154L. The ohmic contact members 163H and 165L may be formed of a silicide and/or a material such as n+ hydrogenated amorphous silicon, in which an n-type impurity is doped at a high concentration. The ohmic contact members 163H and 165H may be omitted.

A plurality of data lines including a first data line 171H and a second data line 171L, and a data conductor including a plurality of second drain electrodes 175L and a plurality of first drain electrodes 175H, are disposed on the ohmic contact members 163H and 165H, the first and second semiconductors 154H and 154L, and the gate insulating layer 140.

The first and second data lines 171H and 171L transmit a data signal, and mainly extend in a column direction crossing the gate line 121 and the storage electrode line 131. The first and second data lines 171H and 171L may transmit data voltages that representing different luminance in response to one image signal, respectively. For example, for an image signal having a single gray-level, the data voltage transmitted via the second data line 171L may be smaller than the data voltage transmitted via the first data line 171H. However, the exemplary embodiments are not limited thereto.

The first data line 171H may include a first source electrode 173H protruding toward the first gate electrode 124H, and the second data line 171L may include a second source electrode 173L protruding toward the second gate electrode 124L.

The first and second drain electrodes 175H and 175L include one wide end portion and the other rod-shaped end portion, respectively. The wide end portions of the first and second drain electrodes 175H and 175L may overlap the storage electrodes 135 that protrude downward from the storage electrode line 131. The wide end portion of the first drain electrode 175H may overlap one of the storage electrodes 135, and the wide end portion of the second drain electrode 175L may overlap the other one of the storage electrodes 135. The rod-shaped end portions of the first and second drain electrodes 175H and 175L may respectively be partially surrounded by the first and second source electrodes 173H and 173L.

The first gate electrode 124H, the first source electrode 173H, the first drain electrode 175H, and the first semiconductor 154H form a thin film transistor QH, and the second gate electrode 124L, the second source electrode 173L, the second drain electrode 175L, and the second semiconductor 154L form a second thin film transistor QL. The first and second thin film transistors QH and QL include channels respectively formed in the first and second semiconductors 154H and 154L disposed between the source electrodes 173H and 173L and the drain electrodes 175H and 175L facing each other, respectively. The first and second thin film transistors QH and QL may function as switching elements for transmitting the data voltage according to the gate signal transmitted through the gate line 121.

Referring to FIG. 1, one pixel PX includes first and second light transmitting regions OPa and OPb neighboring each other, and a light blocking region BFZ disposed therebetween.

The first and second light transmitting regions OPa and OPb are regions configured to display image, and thus, may transmit the light, and the light blocking region BFZ is an area not configured to display the image, and thus, may not transmit the light.

The gate line 121, the storage electrode line 131, and the first and second thin film transistors QH and QL may be disposed in the light blocking region BFZ.

A first insulating layer 180a is disposed on the data conductor. The first insulating layer 180a may be formed of an organic insulating material and/or an inorganic insulating material, and may include a single layer or multiple layers.

A color filter 230 may be disposed on the first insulating layer 180a. The color filter 230 may display one of three primary colors such as red, green, and blue, or one of four primary colors. The color filter 230 is not limited to displaying one of the three primary colors of red, green, and blue. For example, the color filter 230 may display cyan, magenta, yellow, white-based colors, and the like.

Each color filter 230 may be disposed elongated along a pixel column. The color filter 230 includes openings 235 respectively disposed on at least a portion of the first and second drain electrodes 175H and 175L.

A second insulating layer 180b may be disposed on the color filter 230. The second insulating layer 180b may include an inorganic insulating material and/or an organic insulating material.

The second insulating layer 180b may be disposed as an overcoat over the color filter 230, and may reduce or prevent the color filter 230 from being exposed and provide a flat surface. The second insulating layer 180b may be omitted.

The first and second insulating layers 180a and 180b include a first contact hole 181H exposing a part of the first drain electrode 175H, and a second contact hole 181L exposing a part of the second drain electrode 175L. The first and second contact holes 181H and 181L may be disposed in the openings 235 of the color filter 230, respectively.

A plurality of pixel electrodes is disposed on the second insulating layer 180b.

One pixel electrode of the plurality of pixel electrodes may include one electrode, and/or may include a plurality of subpixel electrodes. According to exemplary embodiments, one pixel electrode includes a first subpixel electrode 191H and a second subpixel electrode 191L. The first subpixel electrode 191H may be substantially disposed in the first light transmitting region OPa, while the second subpixel electrode 191L may be substantially disposed in the second light transmitting region OPb. That is, the first and second subpixel electrodes 191H and 191L may be respectively disposed at upper side and lower side with respect to the light blocking region BFZ. However, arrangement and shapes of the first and second subpixel electrodes 191H and 191L according to the exemplary embodiments are not limited thereto, and may be modified in various ways.

The first and second subpixel electrodes 191H and 191L may substantially have, for example, quadrangular shapes. The first and second subpixel electrodes 191H and 191L may respectively include cross-shaped stem portions including horizontal stem portions 193H and 193L and vertical stem portions 192H and 192L, and a plurality of branch portions 194H and 194L extending out from the cross-shaped stem portions, respectively.

The first subpixel electrode 191H and/or the second subpixel electrode 191L may be respectively divided into four subregions by the horizontal stem portions 193H and 193L and the vertical stem portions 192H and 192L. The branch portions 194H and 194L extend diagonally from the horizontal stem portions 193H and 193L and the vertical stem portion 192H and 192L, at an angle of about 45° or 135° with the gate line 121 and/or the horizontal stem portions 193H and 193L. The branch portions 194H and 194L disposed in the adjacent subregions may extend in different directions, and, for example, may be perpendicular to each other.

The first and second subpixel electrodes 191H and 191L may further include an outer stem portion (not shown) enclosing outer edges of the first and second light transmitting regions OPa and OPb, respectively.

The first subpixel electrode 191H includes first extensions 196H1 and 196H2 extending toward the light blocking region BFZ, and the second subpixel electrode 191L includes second extensions 196L1 and 196L2 extending toward the light blocking region BFZ.

The first extensions 196H1 and 196H2 include a first vertical portion 196H1 connected to a lower side of the first subpixel electrode 191H disposed in the first light transmitting region OPa, and a first horizontal portion 196H2 connected to the first vertical portion 196H1.

Referring to FIG. 1, the first vertical portion 196H1 may extend, from the branch portions 194H or the vertical stem portion 192H of the first subpixel electrode 191H, in a substantially vertical direction toward the light blocking region BFZ. The first vertical portion 196H1 may be substantially aligned with the vertical stem portion 192H of the first subpixel electrode 191H, but the exemplary embodiments are not limited thereto, and may be shifted slightly to the left or right thereof.

The first horizontal portion 196H2 extends in a direction that is different from that of the first vertical portion 196H1, and for example, may extend in a substantially horizontal direction. The first horizontal portion 196H2 may include an expansion 195H at the end thereof. The expansion 195H may overlap the wide end portion of the first drain electrode 175H. The expansion 195H may be connected to the first drain electrode 175H via the first contact hole 181H, and may be applied with the data voltage.

The second extensions 196L1 and 196L2 include a second vertical portion 196L1 connected to an upper side of the second subpixel electrode 191L, and a second horizontal portion 196L2 connected to the second vertical portion 196L1.

Referring to FIG. 1, the second vertical portion 196L1 may extend, from the branch portions 194L or the vertical stem portion 192L of the second subpixel electrode 191L, in the substantially vertical direction toward the light blocking region BFZ. The second vertical portion 196L1 may be substantially arranged with the vertical stem portion 192L of the second subpixel electrode 191L, but is the exemplary embodiments are not limited thereto and may be slightly shifted to the left or right thereof.

The second horizontal portion 196L2 may extend in a direction that is different from that of the second vertical portion 196L1, and for example, may extend in the substantially horizontal direction. The second horizontal portion 196L2 may include an expansion 195L at the end thereof. The expansion 195L may overlap the wide end portion of the second drain electrode 175L. The expansion 195L may be connected to the second drain electrode 175L via the second contact hole 181L, and may be applied with the data voltage.

The expansion 195H of the first horizontal portion 196H2 and the expansion 195L of the second horizontal portion 196L2 may be disposed adjacent to each other in the horizontal direction, as shown in FIG. 1.

When the first and second thin film transistors QH and QL are turned on, the first and second subpixel electrodes 191H and 191L may respectively be applied with the data voltages from the first and second drain electrodes 175H and 175L.

The first and second subpixel electrodes 191H and 191L may include a transparent conductive material including at least one of indium tin oxide (ITO), indium zinc oxide (IZO), a metal foil, etc.

The exemplary embodiments are not limited to the layout and shape of the pixel PX, the structure of the thin film transistor, and the shape of the pixel electrode as currently described, and therefore, may be variously modified.

A plurality of spacers 330, a first protruding portion 330H, and a second protruding portion 330L are disposed on the pixel electrode and the second insulating layer 180b. The spacers 330 and the first and second protruding portions 330H and 330L may be disposed on the same layer, and may include the same material. According to exemplary manufacturing processes of the LCD, the spacers 330 and the first and second protruding portions 330H and 330L may be formed through the same process.

The spacer 330 may be configured to support or maintain a cell gap of the liquid crystal layer 3. The cell gap refers to an interval between the lower panel 100 and the upper panel 200. An upper surface of the spacer 330 may substantially contact a lower surface of the upper panel 200, or may have a predetermined gap therebetween. A height of the spacer 330 may be fixed or varied. The spacer 330 may be disposed in the light blocking region BFZ, or may be disposed overlapping the signal lines including the gate line 121 and the data lines 171H and 171L.

The first and second protruding portions 330H and 330L may have a height H1 lower than that of the spacer 330. For example, the height H1 of the first and second protruding portions 330H and 330L may be about 0.5 μm to about 1.5 μm, but exemplary embodiments are not limited thereto. A maximum value of the height H1 may vary depending on the cell gap of the liquid crystal layer 3, and may be determined based on a spreadability of the liquid crystal layer 3. A minimum value of the height H1 may be determined in consideration of control over the liquid crystal molecules 31.

A width W1 of the first and second protruding portions 330H and 330L may be about 5 μm to about 20 μm, but exemplary embodiments are not limited thereto. The minimum value of the width W1 may be smaller according to an exposure limitation, and the maximum value of the width W1 may change depending on a size or resolution of the LCD. However, the maximum value of the width W1 may be limited in response to high resolution of the liquid crystal display.

The first and second protruding portions 330H and 330L may include a first protruding portion 330H disposed adjacent to the first contact hole 181H and a second protruding portion 330L disposed adjacent to the second contact hole 181L, but the exemplary embodiments not limited thereto, and either one of the first and second protruding portions 330H and 330L may be omitted.

According to the exemplary embodiments, the first protruding portion 330H may overlap the first horizontal portion 196H2 of the first extension. That is, the first protruding portion 330H may be located at a point where the first horizontal portion 196H2 is connected to the expansion 195H, and may cross the first horizontal portion 196H2 in the vertical direction.

Referring to FIGS. 1 and 2, the first protruding portion 330H includes a reverse stepped side A2 facing the first contact hole 181H, and a forward stepped side A1 facing opposite to the reverse stepped side A2. The forward stepped side A1 and the reverse stepped side A2 may cross the first horizontal portion 196H2, respectively.

The second protruding portion 330L may overlap the second horizontal portion 196L2 of the second extension. That is, the second protruding portion 330L may be located at a point where the second horizontal portion 196L2 is connected to the expansion 195L, and may cross the second horizontal portion 196L2 in the vertical direction.

Referring to FIG. 1, the second protruding portion 330L includes a reverse stepped side A2 facing the second contact hole 181L, and a forward stepped side A1 facing opposite to the reverse stepped side A2. The forward stepped side and the reverse stepped side may cross the second horizontal portion 196L2, respectively.

A height of the forward stepped side A1 of the first and second protruding portions 330H and 330L may be higher closer to the first contact hole 181H. A taper angle AG1, which is an angle formed between the forward stepped side A1 and an upper surface of the display panel 100 and the substrate 110 inside the first and second protruding portions 330H and 330L, may be about 5° to about 60°. A minimum value of the taper angle AG1 may be determined in consideration of control over the liquid crystal molecules 31, and a maximum value of the taper angle AG1 may vary depending on exposure process capability.

Similarly, a taper angle formed between the reverse stepped side A2 and the upper surface of the display panel 100 and the substrate 110 inside the first and second protruding portions 330H and 330L, may be about 5° to about 60°.

The spacer 330 and the first and second protruding portions 330H and 330L may include an organic material. The spacer 330 and the first and second protruding portions 330H and 330L may be transparent, or may represent colors such as black and the like. The spacer 330 and the first and second protruding portions 330H and 330L may be formed by using one photomask. In this case, the photomask may include a light transmitting region configured to transmit light, a light blocking region configured to block light, and a halftone region configured to partially transmit light. The halftone region may correspond to the first and second protruding portions 330H and 330L. The halftone region may include a plurality of slits or a semi-transmissive portion configured to partially transmit light.

An alignment layer (not shown) may be coated on the spacer 330 and the first and second protruding portions 330H and 330L. The alignment layer may be a vertical alignment layer. The alignment layer may be rubbed in at least one direction, or may be a photoalignment layer including a photoalignment material.

Next, the upper panel 200 will be described. A light blocking member 220 may be disposed on a substrate 210 including an insulating material such as glass, plastic, etc. The light blocking member 220 may include a portion disposed in the light blocking region BFZ, and a portion disposed between the adjacent pixels PX. The light blocking member 220 may reduce or prevent leakage of light between the pixels PX and/or between the first light transmitting region OPa and the second light transmitting region OPb. According to exemplary embodiments, the light blocking member 220 may be disposed in the lower panel 100.

An overcoat 250 may be disposed on the light blocking member 220 and the substrate 210. The overcoat 250 may reduce or prevent the light blocking member 220 from being exposed, and may provide a flat surface. The overcoat 250 may reduce or prevent impurities such as a pigment of the light blocking member 220 from flowing into the liquid crystal layer 3.

An opposing electrode 270 may be disposed on the overcoat 250. The opposing electrode 270 may be formed as a whole plate having a planar shape on an entire surface of the substrate 210. The opposing electrode 270 may be configured to transmit a constant common voltage Vcom. The opposing electrode 270 may include a transparent conductive material including at least one of ITO, IZO, a metal foil, etc.

An alignment layer (not shown) may be coated on the opposing electrode 270.

The alignment layer may be a vertical alignment layer. The alignment layer may be rubbed in at least one direction, or may be a photoalignment layer including a photoalignment material.

The liquid crystal layer 3 includes a plurality of liquid crystal molecules 31. The liquid crystal molecules 31 may have negative dielectric anisotropy, and may be aligned substantially vertically with respect to the substrates 110 and 210 when no electric field is generated in the liquid crystal layer 3. The liquid crystal molecules 31 may be pretilted in predetermined directions when no electric field is generated in the liquid crystal layer 3.

For example, the liquid crystal molecules 31 may be pretilted substantially parallel to the branch portions 194H and 194L of the first and second subpixel electrodes 191H and 191L.

Referring to FIGS. 1, 2, and 3, one pixel PX of the LCD according to the exemplary embodiments may be connected to the first and second data lines 171H and 171L and the gate line 121, and may include a first subpixel PXa and a second subpixel PXb. The first subpixel PXa and the second subpixel PXb may be disposed along a direction of a pixel column or row. The light blocking region BFZ may be disposed between the first subpixel PXa and the second subpixel PXb.

The first subpixel PXa includes the first thin film transistor QH connected to the gate line 121 and the first data line 171H, and a first liquid crystal capacitor Clc_H connected to the first thin film transistor QH. The first liquid crystal capacitor Clc_H may use the first subpixel electrode 191H and the opposing electrode 270 as two terminals, and may include the liquid crystal layer 3 therebetween as a dielectric material.

The second subpixel PXb includes the second thin film transistor QL connected to the gate line 121 and the second data line 171L, and a second liquid crystal capacitor Clc_L connected to the second thin film transistor QL. The second liquid crystal capacitor Clc_L may use the second subpixel electrode 191L and the opposing electrode 270 as two terminals, and may include the liquid crystal layer 3 therebetween as the dielectric material.

At least one polarizer (not shown) may be further disposed at outer surfaces of the display panels 100 and 200.

Figure 4:
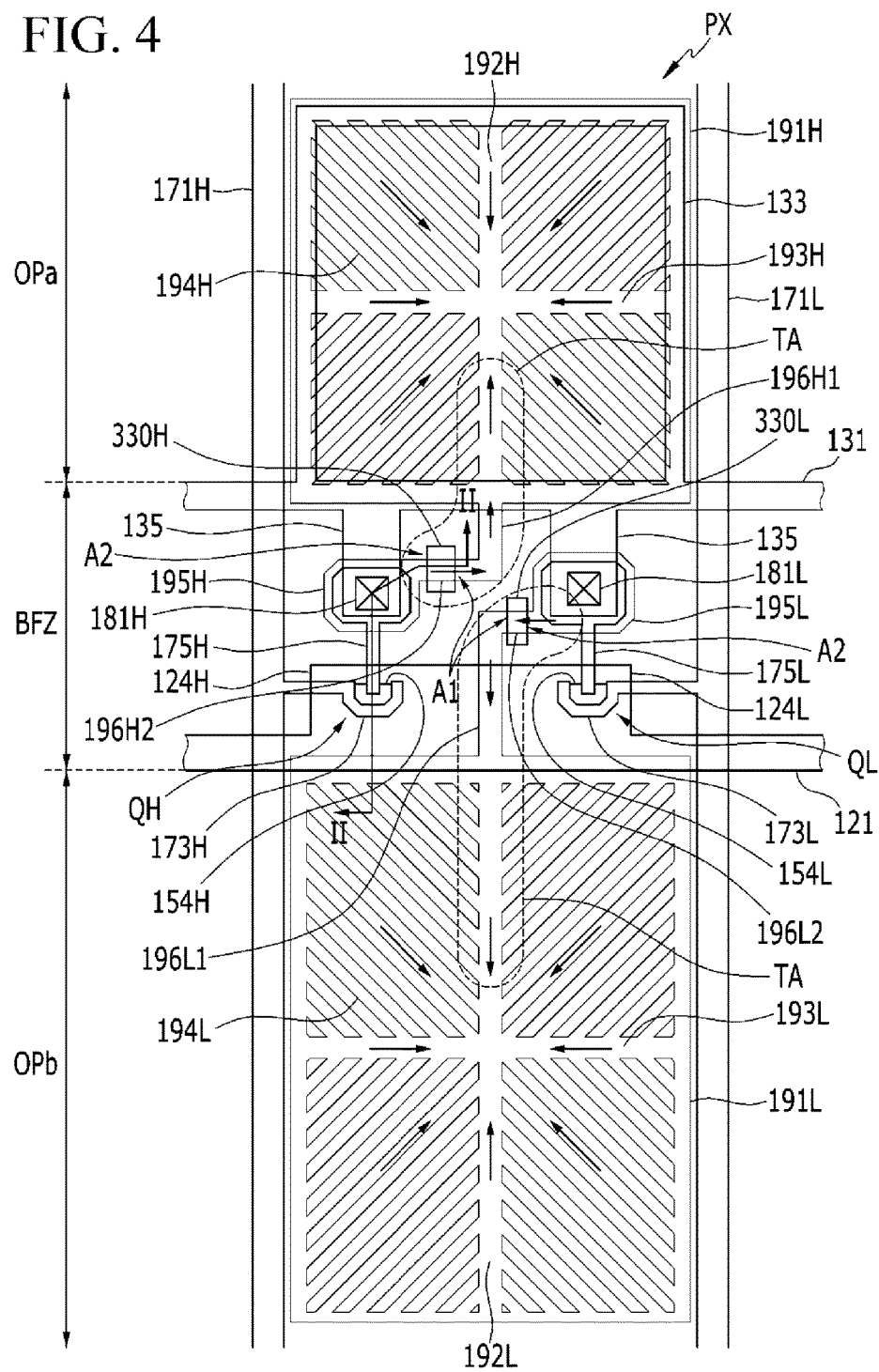
FIG. 4 is a drawing illustrating alignment directions of liquid crystal molecules when an electric field is generated in a liquid crystal layer of the LCD according to an exemplary embodiment.

Next, an operation of an LCD according to an exemplary embodiment will be described with reference to FIGS. 4 and 5 with the aforementioned drawings.

When a gate-on voltage Von is applied to a gate line 121, first and second thin film transistors QH and QL connected thereto are turned on, and data voltages transmitted via first and second data lines 171H and 171L are respectively applied to first and second subpixel electrodes 191H and 191L. The first and second subpixel electrodes 191H and 191L generate an electric field in a liquid crystal layer 3 with an opposing electrode 270, to which the common voltage Vcom is applied.

The electric field generated in the liquid crystal layer 3 includes a vertical component that is substantially perpendicular to surfaces of display panels 100 and 200, and the liquid crystal molecules 31 are tilted by the vertical component of the electric field such that the liquid crystal molecules 31 are substantially in parallel with surfaces of display panels 100 and 200. A fringe field is generated between edge sides of horizontal stem portions 193H and 193L, vertical stem portions 192H and 192L, and branch portions 194H and 194L of the first and second subpixel electrodes 191H and 191L and the opposing electrode 270. The liquid crystal molecules 31 are tilted, as marked with arrows in FIG. 4, according to the fringe field toward a center of the cross-shaped stem portion 192H and 192L and substantially parallel to the branch portions 194H and 194L. A response speed of the liquid crystal molecules 31 may be enhanced by pretilting the liquid crystal molecules 31 parallel to the branch portions 194H and 194L.

Specifically, the liquid crystal molecules 31 disposed on the horizontal stem portions 193H and 193L and the vertical stem portion 192H and 192L are also tilted toward the center of the cross-shaped stem portion. As marked with TA in FIG. 4, the liquid crystal molecules 31 disposed on first extensions 196H1 and 196H2 and second extensions 196L1 and 196L2 respectively extending from the vertical stem portions 192H and 192L or the branch portions 194H and 194L are tilted in the predetermined directions along extending directions of the vertical stem portions 192H and 192L, the first extensions 196H1 and 196H2, and the second extensions 196L1 and 196L2. This may be referred to as a normal arrangement of the liquid crystal molecules 31.

When an external force is applied to the LCD in which the liquid crystal molecules 31 are rearranged as the electric field is generated in the liquid crystal layer 3, the arrangement of the liquid crystal molecules 31 may be partially disturbed and cause abnormal arrangement of the liquid crystal molecules 31. The abnormal arrangement of the liquid crystal molecules 31 is generally restored to normal arrangement, but the liquid crystal molecules 31 disposed at first and second contact holes 181H and 181L may not be restored back to the original arrangement and the abnormal arrangement may be maintained, because of step differences caused by the first and second contact holes 181H and 181L and inclination of the alignment layer caused by the step differences, as shown in FIG. 2. Specifically, when layers formed with the first and second contact holes 181H and 181L include an organic material such as the color filter 230, the step differences of the first and second contact holes 181H and 181L may further increase, making the restoration of the arrangement of the liquid crystal molecules 31 around the first and second contact holes 181H and 181L to the original arrangement further different.

The liquid crystal molecules 31 dispersed around the first and second contact holes 181H and 181L may propagate along the first extensions 196H1 and 196H2 and the second extensions 196L1 and 196L2 that are respectively adjacent to the first and second contact holes 181H and 181L, effecting the even arrangement of the liquid crystal molecules 31 of the first and second light transmitting regions OPa and OPb. Thus, the arrangement of the liquid crystal molecules disposed in the light transmitting region of the pixel may not be controlled.

According to the exemplary embodiments, the first and second protruding portions 330H and 330L may be disposed on the first extensions 196H1 and 196H2 and/or the second extensions 196L1 and 196L2 that are adjacent to the first and second contact holes 181H and 181L, so the abnormal arrangement of the liquid crystal molecules 31 adjacent to the first and second contact holes 181H and 181L may be reduced or prevented from propagating to the first and second light transmitting regions OPa and OPb.

Figure 5:
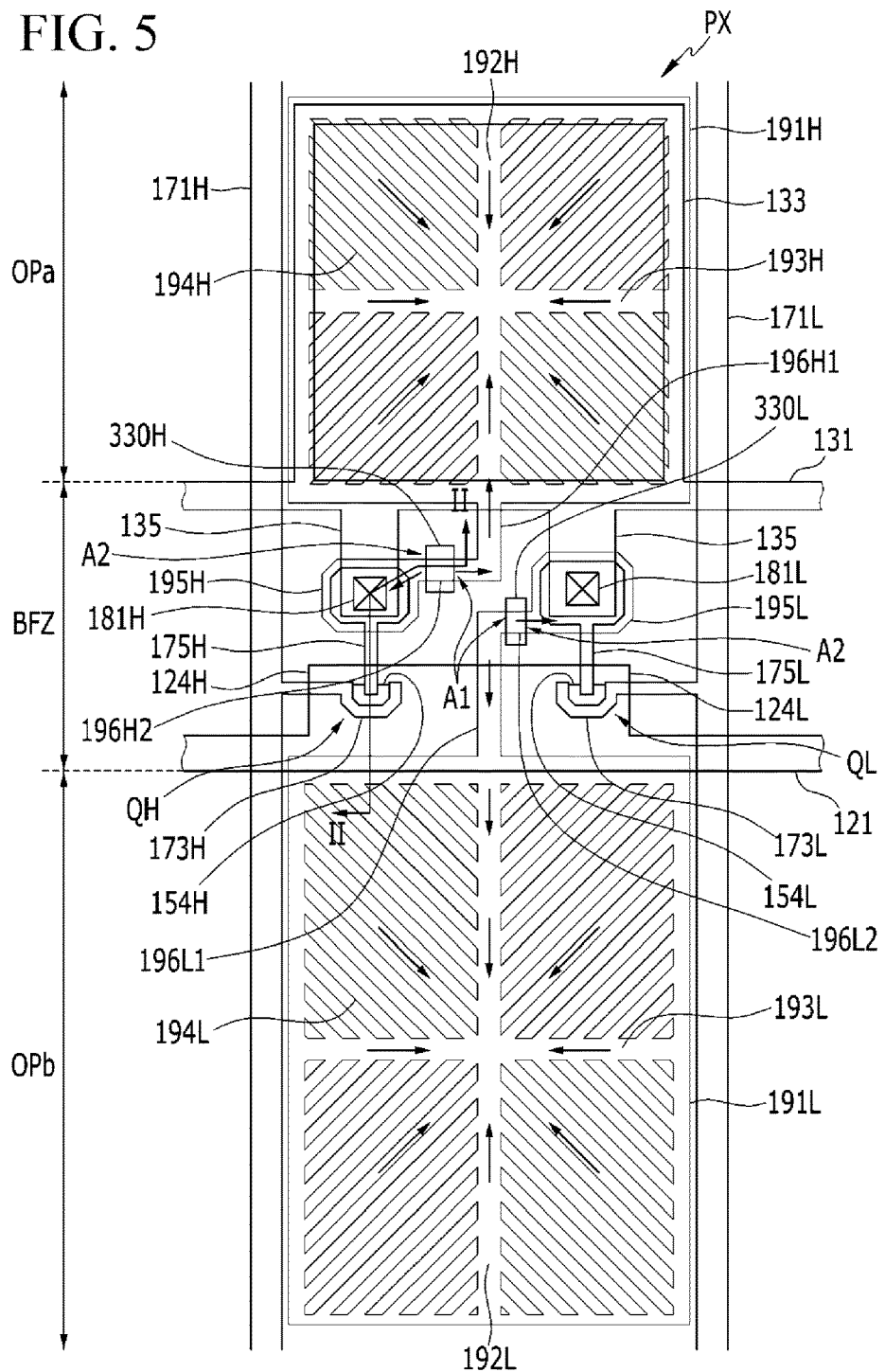
FIG. 5 is a drawing illustrating the alignment directions of the liquid crystal molecules when an external force is applied to the LCD after the electric field is generated in the liquid crystal layer of the LCD according to an exemplary embodiment.

Referring to FIGS. 2 and 5, the liquid crystal molecules 31 on the reverse stepped side A2 of the first and second protruding portions 330H and 330L are tilted toward the first and second contact holes 181H and 181L by the inclination of the reverse stepped side A2, while the liquid crystal molecules 31 on the forward stepped side A1 of the first and second protruding portions 330H and 330L are tilted in an opposite direction with respect to the first and second contact holes 181H and 181L by the inclination of the forward stepped side A2. Such arrangement of the liquid crystal molecules 31 is identical to the normal arrangement before the external force is applied when they are arranged in the predetermined directions along the extending directions of the vertical stem portions 192H and 192L, the first extensions 196H1 and 196H2, and the second extensions 196L1 and 196L2.

That is, the first and second protruding portions 330H and 330L may reduce or block the abnormal arrangement of the liquid crystal molecules 31 adjacent to the first and second contact holes 181H and 181L from propagating to the first and second light transmitting regions OPa and OPb, and therefore, may reduce or prevent the texture associated with the propagation from being generated in the first and second light transmitting regions OPa and OPb.

According to the exemplary embodiments, the first and second subpixel electrodes 191H and 191L of the LCD include a plurality of subregions that respectively have different extending directions of the branch portions 194H and 194L, and the liquid crystal layer 3 of the single pixel PX includes a plurality of domains in which tilt directions of the liquid crystal molecules 31 are respectively different. Accordingly, a wide viewing angle may be implemented.

The liquid crystal molecules 31 newly arranged by the electric field generated in liquid crystal layer 3 may be configured to change a polarization direction of light that is incident on the liquid crystal layer 3. Such polarization variation is represented as a change in transmittance of light by the polarizer, and the pixel PX may display luminance that is represented by a gray level of an image signal.

According to the exemplary embodiments, the first and second protruding portions 330H and 330L are disposed adjacent to the first and second contact holes 181H and 181L and to block the propagation of the abnormal arrangement of liquid crystal molecules 31 due to the step differences of the first and second contact holes 181H and 181L, but positions of the first and second protruding portions 330H and 330L are not limited thereto. For example, when an upper surface of the lower panel 100 contacting the liquid crystal layer 3 is dented and thus has a portion with a large step difference, the first and second protruding portions 330H and 330L the current exemplary embodiment can be formed around the portion to effectively reduce or prevent the abnormal arrangement of the liquid crystal molecules 31 generated in the portion with the large step from propagating to the light transmitting areas.

In this case, the first and second protruding portions 330H and 330L may be disposed on the extension that is extended from the stem portion such as the cross-shaped stem portion of the pixel electrode.

Figure 6:
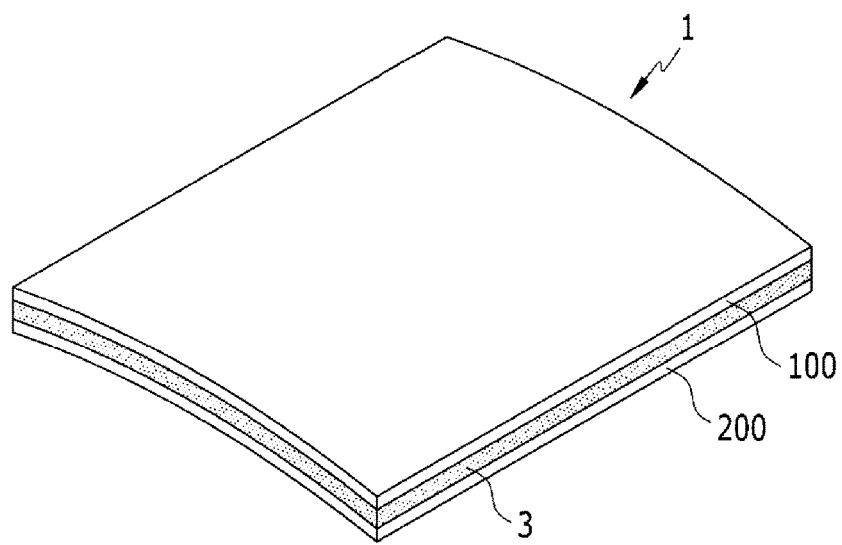
FIG. 6 is a perspective view of the LCD according to an exemplary embodiment.

FIG. 6 is a perspective view of the LCD according to the exemplary embodiments.

Referring to FIG. 6, the LCD according to the exemplary embodiments 1 may be a curved type. The curved liquid crystal display 1 may be bent or curved along at least one direction, and a curvature radius thereof may be constant or vary depending on a position.

Now, a liquid crystal display according to an exemplary embodiment will now be described with reference to FIG. 7 in connection with the aforementioned drawings.

Figure 7:
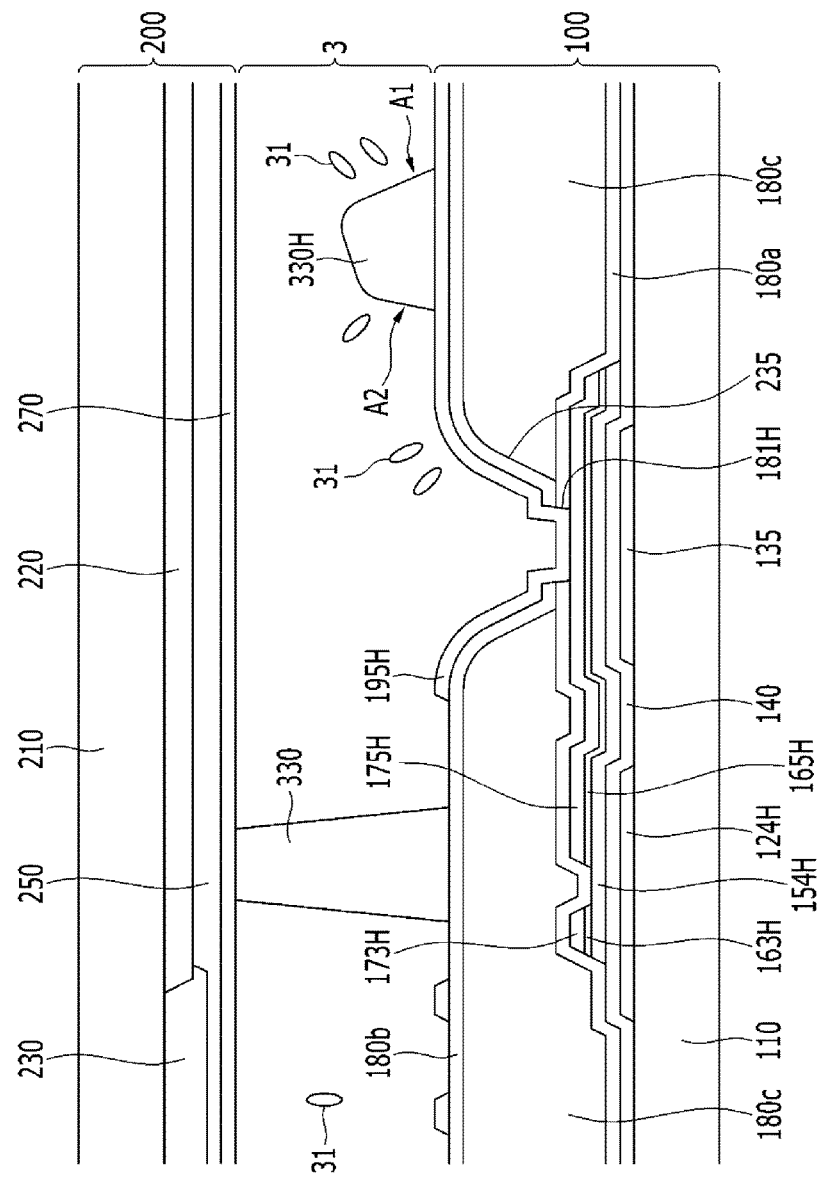
FIG. 7 is a cross-sectional view of the LCD of FIG. 1 taken along the sectional line II-II, according to an exemplary embodiment.

FIG. 7 is the cross-sectional view of an exemplary LCD of FIG. 1 taken along the sectional line II-II.

Referring to FIG. 7, the LCD according to the current exemplary embodiments is substantially the same as the aforementioned LCD according to the exemplary embodiment illustrated in FIGS. 1, 2, 3, 4, 5, and 6, but the lower panel 100 may have a different structure.

According to the exemplary embodiments, instead of a color filter 230, a third insulating layer 180c may be disposed between the thin film transistors QH and QL and the first and second subpixel electrodes 191H and 191L. The third insulating layer 180c may include an insulating material, specifically, an organic insulating material. At least either one of first and second insulating layers 180a and 180b may be omitted.

The color filter 230 may be disposed in the upper panel 200. More specifically, the color filter 230 may be disposed between the substrate 210 and the overcoat 250. The color filter 230 may be disposed in the lower panel 100.

Since other characteristics and effects thereof are the same as the aforementioned description, a detailed description thereof will be omitted.

An LCD according to the exemplary embodiments will be described with reference to FIGS. 8, 9, 10 and 11 along with the aforementioned drawings.

FIGS. 8, 9, 10, and 11 are layout views of single pixels of liquid crystal displays according to exemplary embodiments.

Figure 8:
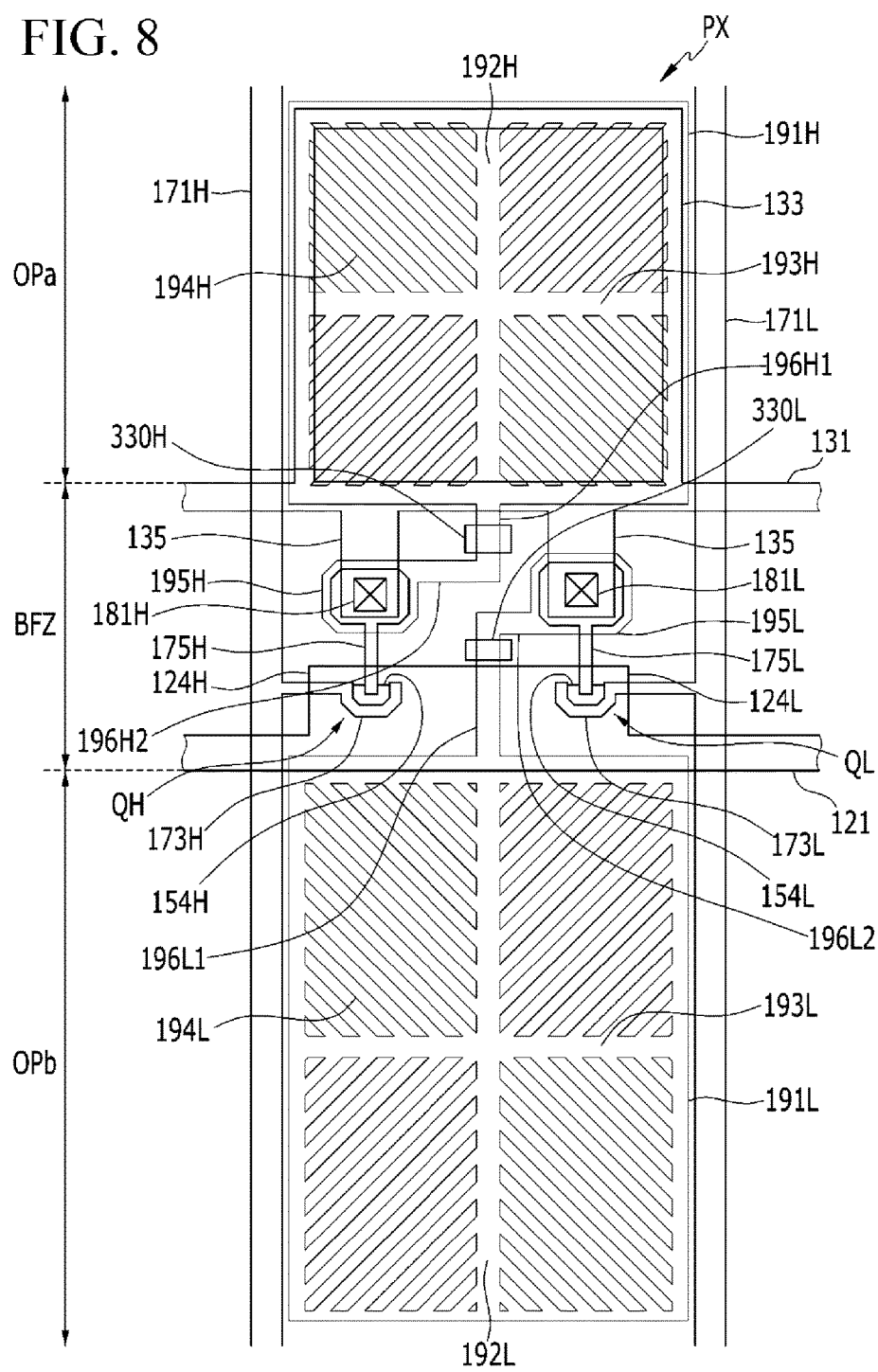

Referring to FIG. 8, the LCD, according to the exemplary embodiments is substantially the same as the aforementioned liquid crystal display according to the exemplary embodiment illustrated in FIGS. 1, 2, 3, 4, 5, and 6, but the first and second protruding portions 330H and 330L may have different positions.

According to the exemplary embodiments, the first protruding portion 330H may overlap the first vertical portion 196H1 of the first extension. The first protruding portion 330H may cross the first vertical portion 196H1 in the horizontal direction. The first protruding portion 330H includes the reverse stepped side facing the first contact hole 181H, and the forward stepped side facing opposite to the reverse stepped side. The forward stepped side and the reverse stepped side may cross the first vertical portion 196H1, respectively.

A second protruding portion 330L may overlap the second vertical portion 196L1 of the second extension. The second protruding portion 330L may cross the second vertical portion 196L1 in the horizontal direction. The second protruding portion 330L includes the reverse stepped side facing the second contact hole 181L, and the forward stepped side facing opposite to the reverse stepped side.

The forward stepped side and the reverse stepped side may cross the second vertical portion 196L1, respectively.

In addition, the specific shape and structure of the first and second protruding portions 330H and 330L are the same as those of the aforementioned exemplary embodiment, so a detailed description thereof will be omitted.

Figure 9:
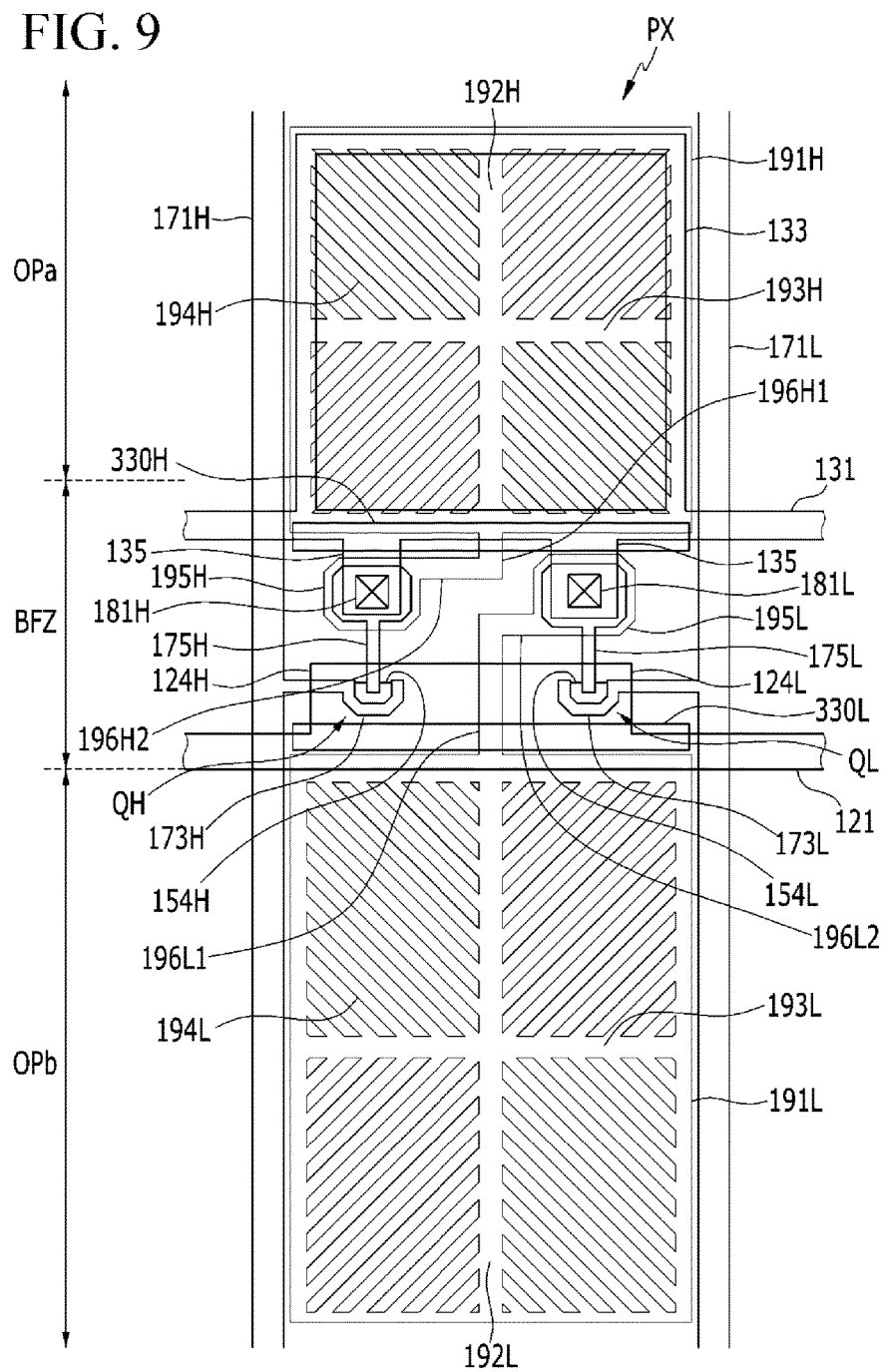

Referring to FIG. 9, an LCD according to an exemplary embodiments is substantially the same as the LCD according to the aforementioned exemplary embodiment illustrated in FIGS. 1, 2, 3, 4, and 5, but the first and second protruding portions 330H and 330L may have different shapes and positions.

According to the current exemplary embodiments, a first protruding portion 330H is disposed between the vertical stem portion 192H of the first subpixel electrode 191H and the first contact hole 181H, and may be formed along a boundary between the first light transmitting region OPa and the light blocking region BFZ. The first protruding portion 330H may be formed along a lower side of the first subpixel electrode 191H, and at least one side of the first protruding portion 330H may cross the first vertical portion 196H1 in the horizontal direction.

Accordingly, abnormal arrangement of the liquid crystal molecules 31 started from the first contact hole 181H by an external force, may be reduced or prevented from propagating to the first light transmitting region OPa.

Similarly, a second protruding portion 330L is disposed between the vertical stem portion 192L of the second subpixel electrode 191L and the second contact hole 181L, and may be formed along a boundary between the second light transmitting region OPb and the light blocking region BFZ. The second protruding portion 330L may be formed along an upper side of the second subpixel electrode 191L, and at least one side of the second protruding portion 330L may cross the second vertical portion 196L1 in the horizontal direction.

Accordingly, the abnormal arrangement of the liquid crystal molecules 31 started from the second contact hole 181L by the external force may be reduced or prevented from propagating to the second light transmitting region OPb.

Referring to FIG. 10, a liquid crystal display according to an exemplary embodiment is substantially the same as the LCD according to the exemplary embodiment illustrated in FIG. 9, but the first and second protruding portions 330H and 330L may have different shapes.

According to the exemplary embodiments, a first protruding portion 330H is disposed between the vertical stem portion 192H of the first subpixel electrode 191H and the first contact hole 181H, and may further include a first portion 330H1 formed along a boundary between the first light transmitting region OPa and the light blocking region BFZ, and a second portion 330H2 connected to the first portion 330H1.

The first portion 330H1 may be formed along a lower side of the first subpixel electrode 191H, and at least one side of the first portion 330H1 may cross the first vertical portion 196H1 in the horizontal direction.

The second portion 330H2 may substantially extend in the vertical direction, and may overlap the first horizontal portion 196H2. That is, as in the aforementioned exemplary embodiment illustrated in FIGS. 1 and 2, the second portion 330H2 may cross the first horizontal portion 196H2 in the vertical direction.

Similarly, a second protruding portion 330L is disposed between the vertical stem portion 192L of the second subpixel electrode 191L and the second contact hole 181L, and may further include a first portion 330L1 formed along a boundary between the second light transmitting region OPb and the light blocking region BFZ, and a second portion 330L2 connected to the first portion 330L1.

The first portion 330L1 may be formed along an upper side of the second subpixel electrode 191L, and at least one side of the first portion 330L1 may cross the second vertical portion 196L1 in the horizontal direction.

The second portion 330L2 may substantially extend in the vertical direction, and may overlap the second horizontal portion 196L2. That is, the second portion 330L2 may cross the second horizontal portion 196L2 in the vertical direction, as in the aforementioned exemplary embodiment illustrated in FIGS. 1 and 2. According to the exemplary embodiments, when an external force is applied, propagating of the abnormal arrangement of the liquid crystal molecules 31 started from the first and second contact holes 181H and 181L to the first and second light transmitting regions OPa and OPb may be reduced or prevented.

Referring to FIG. 11, an LCD according to an exemplary embodiment is substantially the same as that of the aforementioned exemplary embodiment illustrated in FIG. 10, but the first and second protruding portions 330H and 330L may have different shapes.

According to the current exemplary embodiments, a second portion 330H2 of a first protruding portion 330H is not connected to the middle portion of first portion 330H1 but is connected to an end portion of the first portion 330H1, such that the first protruding portion 330H has an overall bent shape, for example, a '┐' shape. The first portion 330H1 may not overlap the first extension 196H1. Accordingly, the first protruding portion 330H may have a shape for enclosing at least two sides of the first contact hole 181H.

Similarly, the second portion 330L2 of the second protruding portion 330L is not connected to the middle portion of the first portion 330L1 but is connected to an end portion of the first portion 330L1, such that the second protruding portion 330L has an overall bent shape, for example, a '└' shape. The first portion 330L1 may not overlap the second extension 196L1.

Accordingly, the second protruding portion 330L may have a shape for enclosing at least two sides of the second contact hole 181L.

The LCDs according to the exemplary embodiments including two subpixels PXa and PXb have been primarily described, but the exemplary embodiments are not limited thereto, and one pixel PX may include one thin film transistor and one pixel electrode connected thereto or three or more subpixels.

According to the exemplary embodiments, the abnormal arrangement of the liquid crystal molecules generated by the step due to the contact hole may not be allowed to propagate to the light transmitting region of the pixel.

Accordingly, lack of restoration of the disturbed arrangement of the liquid crystal molecules back to the original arrangement may be reduced or prevented by restraining or preventing the abnormal arrangement of the liquid crystal molecules generated by a step due to a contact hole from propagating to the light transmitting region of the pixel and to reduce the texture generation. Therefore, texture generation in the light transmitting region of the pixel can be reduced.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display (LCD) comprising:
a substrate comprising a light transmitting region and a light blocking region adjacent to the light transmitting region;
a thin film transistor disposed in the light blocking region, the thin film transistor comprising a source electrode, a drain electrode, and a gate electrode;
a first insulating layer disposed on the drain electrode, the first insulating layer comprising a contact hole for exposing the drain electrode;
a pixel electrode disposed on the first insulating layer, the pixel electrode connected to the drain electrode through the contact hole; and
a protruding portion disposed on the pixel electrode,
wherein the pixel electrode comprises:
a stem portion disposed in the light transmitting region;
a plurality of branch portions connected to the stem portion; and
an extension disposed in the light blocking region, the extension configured to extend from the stem portion or the branch portions, and
wherein the protruding portion overlaps the extension, and
wherein the protruding portion comprises a first side surface facing the contact hole and a second side surface facing opposite to the first side surface.

2. The LCD of claim 1, wherein the first side surface comprises a reverse stepped side facing the contact hole, and the second side surface comprises a forward stepped side facing opposite to the reverse stepped side.

3. The LCD of claim 1, wherein the first side surface and the second side surface respectively comprise a portion that crosses the extension.

4. The LCD of claim 1, wherein a taper angle formed between the second side surface and a surface of the substrate is 5° to 60°.

5. The LCD of claim 1, wherein a width of the protruding portion is 5 µm to 20 µm.

6. The LCD of claim 1, wherein a height of the protruding portion is 0.5 µm to 1.5 µm.

7. The LCD of claim 1, wherein the first insulating layer comprises an organic material.

8. The LCD of claim 1, wherein the extension comprises:
a vertical portion extending substantially parallel to the stem portion; and
a horizontal portion connected to the vertical portion and extending in a different direction from the vertical portion,
wherein the horizontal portion comprises an expansion connected to the drain electrode.

9. The LCD of claim 8, wherein the protruding portion comprises a portion that crosses the horizontal portion.

10. The LCD of claim 8, wherein the protruding portion comprises a portion that crosses the vertical portion.

11. The LCD of claim 1, wherein the protruding portion comprises a portion disposed between the stem portion and the contact hole, and
wherein the protruding portion is disposed along one side of the pixel electrode.

12. The LCD of claim 11, wherein the protruding portion comprises a portion that extends along a boundary between the light transmitting region and the light blocking region.

13. The LCD of claim 12, wherein at least one side of the protruding portion comprises a portion that crosses the extension.

14. The LCD of claim 12, wherein the extension comprises:
a vertical portion extending substantially parallel to the stem portion; and
a horizontal portion connected to the vertical portion and extending in a different direction from the vertical portion,
wherein at least one side of the protruding portion comprises a first portion that crosses the vertical portion.

15. The LCD of claim 14, wherein the protruding portion further comprises a second portion connected to the first portion and crossing the horizontal portion.

16. The LCD of claim 15, wherein the second portion is connected to a middle portion of the first portion.

17. The LCD of claim 15, wherein the second portion is connected to an end portion of the first portion.

18. The LCD of claim 1, further comprising a liquid crystal layer disposed on the substrate, the liquid crystal layer comprising a plurality of liquid crystal molecules,
wherein the liquid crystal molecules are aligned substantially vertically with respect to a surface of the substrate.

19. The LCD of claim 18, further comprising a spacer disposed on the pixel electrode, wherein the spacer comprises a same material as the protruding portion and is longer than the protruding portion.

20. The LCD of claim 19, wherein the protruding portion and the spacer comprise an organic material.

* * * * *